Sept. 1, 1970     T. O. PAINE, DEPUTY     3,526,134
ADMINISTRATOR OF THE NATIONAL AERONAUTICS
AND SPACE ADMINISTRATION
THERMOBULB MOUNT
Filed May 21, 1968

ROBERT B. SCHAUS
*INVENTOR.*

BY

ATTORNEYS

United States Patent Office 3,526,134
Patented Sept. 1, 1970

3,526,134
THERMOBULB MOUNT
T. O. Paine, Deputy Administrator of the National Aeronautics and Space Administration, with respect to an invention of Robert B. Schaus, Northridge, Calif.
Filed May 21, 1968, Ser. No. 730,702
Int. Cl. G01k 1/08, 1/14
U.S. Cl. 73—343                 2 Claims

ABSTRACT OF THE DISCLOSURE

A fixture for holding a temperature sensing element in a pipeline so as to prevent damage to the element which might otherwise be caused by fluid flow through the pipeline. The fixture comprises an installation boss with a hole through which the sensing element extends, and a recess formed on the inside of the pipeline opposite the boss for supporting the outboard end of the sensing element.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

Field of the invention

This invention relates to fluid measuring apparatus and, more particularly, to improvements therein.

Description of the prior art

The temperature of liquid and gas fluids passing through a pipeline is often measured by a thermobulb. A thermobulb is a temperature sensitive device, generally in the form of a rod, that projects through a hole in the pipeline so that its outboard end is in the fluid stream. The thermobulb may have a thermocouple junction or other element within a thermally conductive housing to enable rapid and arcuate temperature measurements.

In order to assure a rapid response, thermobulbs often have thin housing walls. Such thermobulbs are highly susceptible to mechanical damage under certain flow conditions. Such conditions include high velocity flow, the flow of fluids of high viscosity or mixed phase, and where there is particulate entrainment in the flowing medium. Under such conditions, damage may occur from large deflections or vibrations of the thermobulb. Such deflections and vibrations often cause breaks in the electrical wires and intermittent or permanent open circuits. Such breaks, particularly those which are intermittent, may be difficult to identify and they may necessitate large expenditures of time and effort before corrections are made. Better mechanical support of the thermobulb is difficult because supports are likely to conduct appreciable heat to or from the thermobulb.

OBJECTS AND SUMMARY OF THE INVENTION

An important object of the present invention is to provide a fixture for more firmly supporting a sensing element in a fluid stream.

Another object is to provide means for supporting a thermobulb in a pipeline, in a manner to prevent vibrations under difficult flow conditions.

In accordance with the present invention, a fixture is provided for holding an elongated sensing element in a fluid stream which may flow through a pipeline. The fixture holds the sensing element in a manner which guards it against excessive deflections. The fixture comprises a pipeline section with an aperture therein. The sensing element projects through the aperture to the inside of the pipeline to provide contact with the flowing medium. A recess is formed on the inside of the pipeline section diametrically opposite the aperture for receiving the outboard end of the sensing element, to support it. The recess has a configuration which results in only line contact with the outboard end of the sensing element. This results in a minimum contact area between the pipeline wall and the element and therefore a minimum thermal conduction between them.

In one embodiment of the invention, the thermobulb is a cylindrical rod and the recess is a shallow round hole formed in the pipeline section. The recess has a diameter greater than that of the thermobulb so it contacts the thermobulb along a line on the downstream side of the recess. The diameter of the recess is only slightly greater than the diameter of the thermobulb so that even if vibrations occur, they are of a minimum amplitude.

DESCRIPTION OF THE PREFERRED EMBODIMENTS

Figure 1:
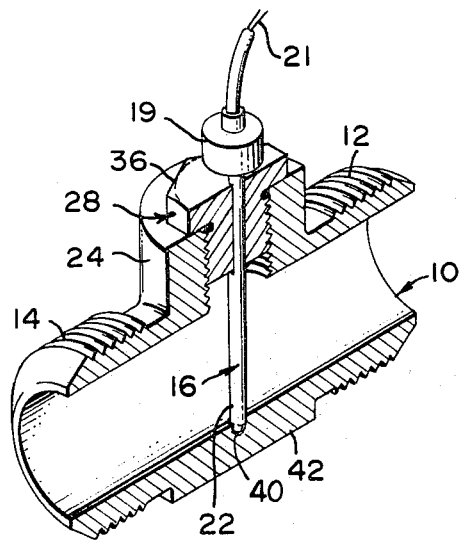
FIG. 1 is a sectional perspective view of a mount constructed in accordance with the invention.
Figure 2:
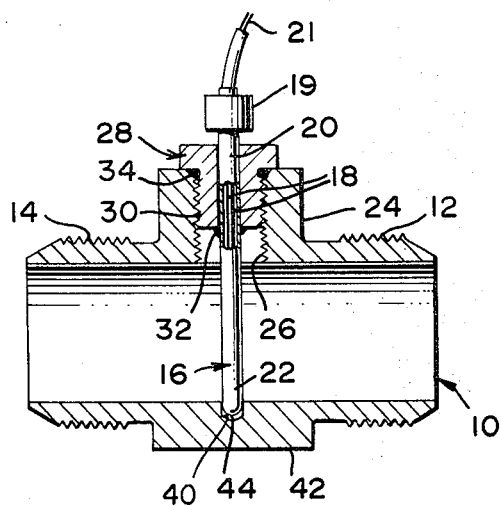
FIG. 2 is a sectional side elevation view of the mount of FIG. 1.

The figures illustrate one embodiment of the invention comprising a fixture 10 whose body forms threaded ends 12 and 14 for connection in series with a pipeline. The fixture is designed to hold a thermobulb 16 for measuring the temperature of the fluid passing through the pipeline. Typically, the thermobulb comprises a thin metal housing within which is a thermocouple junction. A pair of conductors 18 are electrically joined to the thermocouple junction to measure its potential, and therefore the temperature of the flowing medium in the pipeline. An electrical plug 19 is connected to the extreme inboard end of the thermobulb for coupling electrical leads 21 to the conductors 18.

The thermobulb has an inboard end portion 20, and has an outboard end portion 22 which is disposed within the pipeline and in contact with the flowing medium. The fixture comprises a boss 24 whihc serves as a means for engaging the inboard end of the thermobulb to prevent its movement in any direction. A threaded aperture 26 is formed in the boss, the aperture extending through the pipeline walls of the fixture. A bushing 28 has a threaded end 30 engaged in the threaded aperture 26. The thermobulb 16 projects through a central hole in the bushing and through the aperture 26 to the inside of the pipeline. A weld 32 holds the thermobulb to the bushing. The outer end 36 of the bushing has a hexagonal perimeter to enable engagement wit ha wrench. When the bushing is tightened, the bottom surface of the outer end 36 abuts the top of the boss. This limits the depth of immersion of the thermobulb. With the bushing tightened, an O-ring 34 held in a bushing groove is compressed against a bevel at the lip of the boss, and this prevents fluid leakage.

If the outboard end of the thermobulb is not supported, the thermobulb is likely to experience vibrations or large deflections under difficult flow conditions such as high velocity flow. In accordance with the present invention, a recess 40 is formed in the fixture on a side of the pipestream diametrically opposite the installation boss 24. A wall portion 42 of extra thickness is provided to accommodate a recess without unduly weakening the wall. The recess is adapted to receive the extreme outboard end of the thermobulb to support it against downstream movement. The recess generally can be formed by drilling a hole with a drill that extends through the aperture 26.

Figure 3:
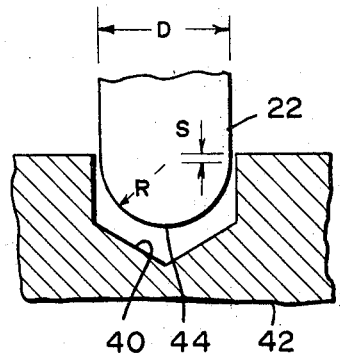
FIG. 3 is a partial sectional view of the mount of FIG. 1.

The fluid passing through the pipeline often may experience a sudden change in temperature so that it is at a different temperature from that of the pipeline walls. In order to reduce errors in the temperature readings, it is necessary to substantially insulate the thermobulb 16 from the walls of the recess 40 while still providing support for the outer end of the thermobulb. This is accomplished by constructing the recess 40 so that it contacts the thermobulb at a minimum area. The minimum area is a line contact between the downstream sides of the recess and bulb. The thermobulb is generally cylindrical, with a diameter shown at D in FIG. 3. In order to accommodate the thermobulb, the recess 40 is constructed with a diameter slightly greater than the diameter of the thermobulb, that is, the recess diameter matches the bulb diameter to provide a clearance between them. The cylindrical portion of the thermobulb extends into the recess a small distance S. As a result, the thermobulb contacts the walls of the recess along a line on the downstream side of the recess.

Appreciable heat conduction can occur between the bushing 28 and the inboard end 20 of the thermobulb. The effect of such conduction can be limited by locating the thermal junction within the thermobulb near the outboard end 22 of the bulb.

The small clearance between the thermobulb and the walls of the recess prevents flutter, since the outboard end of the bulb cannot move back and forth a large distance. Also, the almost equal diameter of the recess and thermobulb results in the fact that the contact area, or width of the contact line, increases substantially as large forces are applied to the thermobulb as in high velocity flow. This prevents denting of the outboard end of the thermobulb under such conditions. The position of the thermobulb when it is welded at 32 to the bushing is chosen to prevent the extreme outboard end 44 of the thermobulb from touching the bottom of the recess.

Other shapes of thermobulbs besides those with a cylindrical cross-section can be utilized. For any such shape, it is preferable to form the recess 40 so that the outboard end of the thermobulb is supported only along line contact. It is also preferable to mate the recess to the downstream side of the thermobulb so that the width of the line contact can increase substantially when large downstream forces are applied to the thermobulb. Furthermore, it is highly desirable to match the perimeter of the recess to the perimeter of the thermobulb at its outboard end, to prevent bulb movement perpendicular to its length and therefore to prevent large amplitude vibrations. The round cross-section recess shown in the figures, which is only slightly greater than the diameter of the bulb, achieves these objectives.

Thermobulb mounts have been constructed in accordance with the above, with 0.001 to 0.002 inch diametral clearances between the cylindrical bulb and recess, each of which was approximately a quarter inch in diameter. The bulbs were fixed in a position to provide an approximately one-tenth inch immersion S of the cylindrical portion of the bulb into the recess. The fixture 10 and bushing 28 were constructed of stainless steel to enable pressures of thousands of pounds per square inch to be withstood. In tests performed with the mounts, the bulbs did not flutter at high flow rates as did bulbs which had not been supported in this manner, and yet the response times of the thermobulbs were not appreciably affected.

In some applications where only moderate pressures, such as pressures of up to 200 p.s.i. are encountered, variable immersion fittings can be readily used. Such fittings facilitate the use of a mounted thermobulb in pipelines of various diameters. Such pressures also enable bushings of nylon, Teflon, or Zytel to be used to provide better insulation between the inboard end of the thermobulb and the fitting boss.

Although particular embodiments of the invention have been described and illustrated herein, it is recognized that modifications and variations may readily occur to those skilled in the art.

What is claimed is:

1. Apparatus useful in combination with a pipeline for measuring the temperature of fluid therein, said apparatus including:
   a tubular body forming a pipe section adapted to be coupled in series with said pipeline, said body including a wall having inner and outer wall surfaces;
   said body wall having an aperture extending therethrough from said outer to said inner wall surface;
   a recess formed in said body wall, opposite to said aperture, and extending from said inner wall surface toward said outer wall surface;
   an elongated cylindrical thermal sensor having an inboard end portion and an outboard end portion;
   means removably supporting said sensor on said body with said inboard end portion proximate to said aperture and said outboard end portion projecting into said recess;
   said sensor having a substantially semi-spherical outer surface at said outboard end portion; and
   said recess being defined by a recess wall having an upper end at said body inner wall surface closely surrounding said sensor outer surface and a lower region diverging from said sensor outer surface, said recess having a diameter greater than the diameter of said thermal sensor to thereby support said sensor outboard end portion with minimal thermal conduction between said body wall and said sensor.

2. The apparatus of claim 1 including a bushing having a threaded outer surface and a central passageway extending therethrough;
   said aperture in said body wall being threaded for threaded engagement with said bushing outer surface; and
   means fixedly securing said sensor in said bushing central passageway.

References Cited

UNITED STATES PATENTS

| 3,081,631 | 3/1963 | Switzer et al. | 73—343 |
| 3,174,340 | 3/1965 | Britt | 73—343 |
| 3,246,521 | 4/1966 | Humphrey | 73—343 XR |

FOREIGN PATENTS

| 600,767 | 2/1926 | France. |

LOUIS R. PRINCE, Primary Examiner

F. SHOON, Assistant Examiner